United States Patent
Sugiyama

(10) Patent No.: US 7,967,381 B2
(45) Date of Patent: Jun. 28, 2011

(54) AUTOMOBILE SEAT WITH FATIGUE REDUCTION FUNCTION

(75) Inventor: Shinji Sugiyama, Tochigi (JP)

(73) Assignee: TS TECH CO., Ltd., Saitama (JP)

( * ) Notice: Subject to any disclaimer, the term of this patent is extended or adjusted under 35 U.S.C. 154(b) by 229 days.

(21) Appl. No.: 12/279,249

(22) PCT Filed: Feb. 13, 2007

(86) PCT No.: PCT/JP2007/052912
§ 371 (c)(1),
(2), (4) Date: Jan. 19, 2009

(87) PCT Pub. No.: WO2007/094492
PCT Pub. Date: Aug. 23, 2007

(65) Prior Publication Data
US 2009/0127906 A1    May 21, 2009

(30) Foreign Application Priority Data

Feb. 13, 2006   (JP) .................................. 2006-035322

(51) Int. Cl.
*A47C 3/00* (2006.01)
(52) U.S. Cl. .................................. 297/284.4; 297/217.3
(58) Field of Classification Search .... 297/284.4–284.8, 297/217.3
See application file for complete search history.

(56) References Cited

U.S. PATENT DOCUMENTS

| 3,924,613 | A | | 12/1975 | Beck | |
|---|---|---|---|---|---|
| 5,065,079 | A | * | 11/1991 | Ogasawara | .................... 318/591 |
| 5,155,685 | A | * | 10/1992 | Kishi et al. | ..................... 701/49 |
| 5,455,494 | A | * | 10/1995 | Ogasawara | .................... 318/267 |
| 5,816,653 | A | | 10/1998 | Benson | |
| 7,566,096 | B2 | * | 7/2009 | Phipps | ........................ 297/217.3 |

FOREIGN PATENT DOCUMENTS

| EP | 1685779 | 8/2006 |
|---|---|---|
| JP | 61-257333 | 11/1986 |
| JP | 7313293 | 12/1995 |
| JP | 2005185373 | 7/2005 |

* cited by examiner

*Primary Examiner* — Sarah B McPartlin
(74) *Attorney, Agent, or Firm* — Dann, Dorfman, Herrell and Skillman, P.C.

(57) ABSTRACT

There is disclosed a vehicle seat provided with a system for facilitating relieving of fatigue of a person driving a vehicle, the vehicle seat comprising a seat back (1) having a pad (5), the system including an occupant's body-motion promoting mechanism (12) provided in the seat back so as to be arranged behind the pad for locally pressing an occupant's body during driving of the vehicle and releasing the occupant's body from pressure, thereby moving the occupant's body and promoting blood circulation of the person. The occupant's body-motion promoting mechanism is configured to intermittently perform repeated pressing/releasing operations with respect to the third lumbar vertebrae of the occupant in a range of three to seven times, at a stroke amount in a range of 10 mm to 20 mm, and at a time interval of 5 minutes to 10 minutes.

24 Claims, 4 Drawing Sheets

AUTOMOBILE SEAT WITH FATIGUE REDUCTION FUNCTION

BACKGROUND OF THE INVENTION

1. Field of the Invention

The present invention relates to a vehicle seat which is provided with a system for facilitating promoting of blood circulation in the lower limbs of an occupant sitting on the vehicle seat for many hours, thereby facilitating relieving of fatigue of the occupant.

2. Description of the Related Art

In a vehicle seat, a fatigue reduction function is required as one of various functions of the vehicle seat. As a fatigue reducing means, there is proposed a fatigue reducing means which is employed in a vehicle seat having an air bag housed within a lumbar support portion of a seat back and is configured to control lumbar supporting pressure (applied to an occupant sitting on the seat by the air bag) against the occupant on the vehicle seat by supplying of air to the air bag and sucking of air from the air bag, thus facilitating relieving of fatigue of the occupant (Japanese Patent Application Laid-Open No. Hei. 7-313293).

In the vehicle seat, unless the occupant feels fatigue, switching of the operation of the air bag is not performed by the occupant, so that fatigue reduction is hard to be timely performed.

In order to address this problem, there is proposed a vehicle seat provided with a fatigue relieving system which includes a detection means provided in a seat back of the vehicle seat for detecting variation in the angle of the pelvis region of an occupant on the seat during driving of a vehicle and an occupant's body-motion promoting means provided in the seat back of the vehicle seat for vibration-pressing the pelvis region of the occupant on the basis of a value of variation in the angle of the pelvis region (Japanese Patent Application Laid-Open No. 2005-185373).

In the vehicle seat, the fatigue relieving system may fail to suitably increase an amount of blood circulation. At this time, if the occupant's body-motion promoting means is operated with increased power, an adverse effect is easy to be exerted on a posture of the occupant on the seat during driving of the vehicle, or the occupant on the seat tends to feel a feeling of physical disorder, so that there is a possibility that a fatigue reduction effect will not be provided to the occupant.

SUMMARY OF THE INVENTION

It is an object of the present invention to provide a vehicle seat with fatigue reduction function which facilitates relieving of fatigue of an occupant sitting on the vehicle seat during driving of a vehicle.

In accordance with the present invention, there is provided a vehicle seat provided with a system for facilitating relieving of fatigue of a person driving a vehicle, the vehicle seat comprising a seat back having a pad, the system including an occupant's body-motion promoting means provided in the seat back so as to be arranged behind the pad for locally pressing an occupant's body during driving of the vehicle and releasing the occupant's body from pressure, thereby moving the occupant's body and promoting blood circulation of the person, the occupant's body-motion promoting means being configured to intermittently perform repeated pressing/releasing operations with respect to the third lumbar vertebrae of the occupant in a range of three to seven times, at a stroke amount in a range of 10 mm to 20 mm, and for a time interval of 5 minutes to 10 minutes.

The occupant's body-motion promoting means may be configured to intermittently perform the repeated pressing/releasing operations at the stroke amount in a range of 15 mm to 20 mm. Moreover, the occupant's body-motion promoting means may be configured to intermittently perform the repeated pressing/releasing operations in a range of three to five times. Furthermore, the occupant's body-motion promoting means may be configured to intermittently perform the repeated pressing/releasing operations for 5 minutes.

According to the vehicle seat provide with the fatigue relieving system of the present invention, the occupant's body-motion promoting means intermittently performs the operation of pressing the third lumbar vertebrae of the occupant on the seat at a level such that the blood circulation of the occupant can be promoted. Thus, it is possible to promote the blood circulation in the lower limbs of the occupant and facilitate relieving of the fatigue of the occupant. Particularly, the occupant is moved so as to be pressed at his/her third lumbar vertebrae, so that the adverse effect is not exerted on the posture of the occupant on the seat, a feeling of physical disorder is not given to the occupant on the seat, and an adverse effect is not exerted on the driving operation by the driver on the seat.

DETAILED DESCRIPTION OF THE PREFERRED EMBODIMENT

Figure 1:
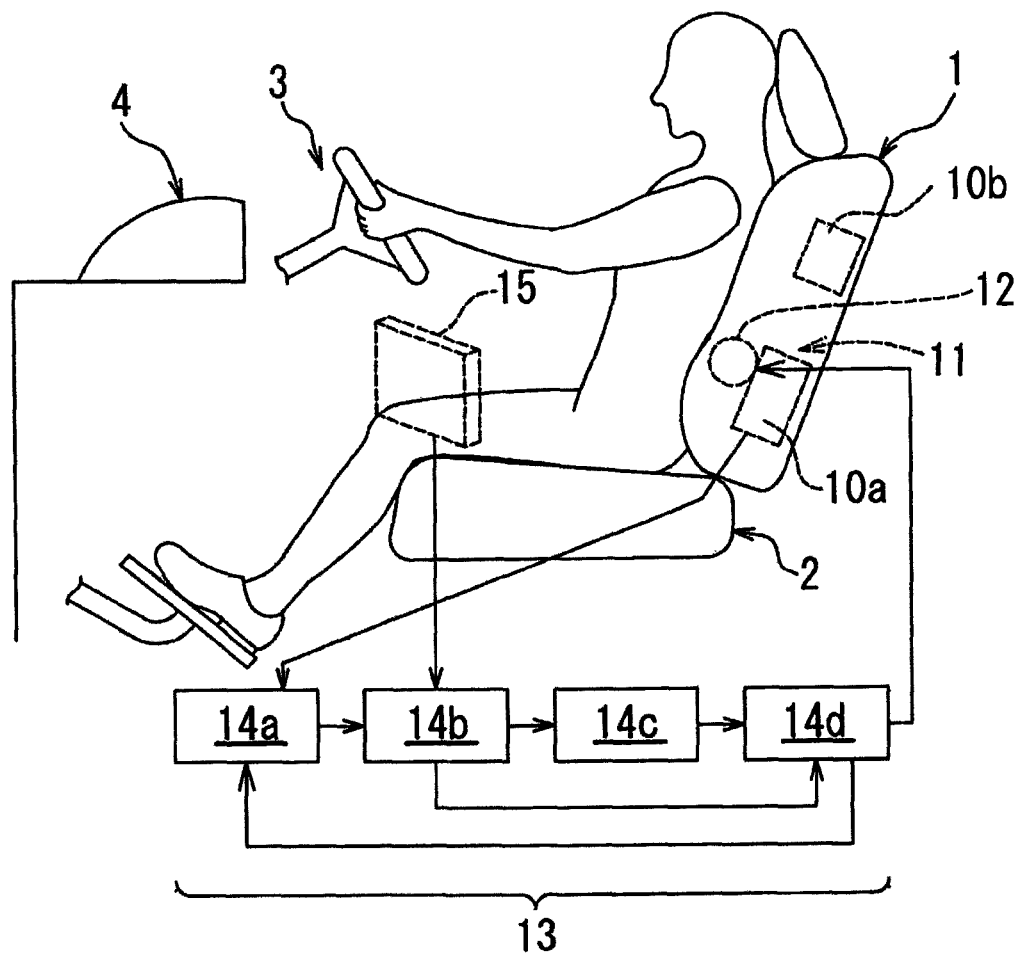
FIG. 1 is a schematic explanatory view illustrating a vehicle seat with fatigue reduction function according to an embodiment of the present invention.

Referring to FIG. 1, there is illustrated a driver's seat for a vehicle according to an embodiment of the present invention, which is provided with a system for facilitating relieving of fatigue of a driver sitting on the vehicle seat during driving of the vehicle. In FIG. 1, reference numeral 1 denotes a seat back of the driver's seat, reference numeral 2 designates a seat cushion of the driver's seat, reference numeral 3 denotes a steering wheel, and reference numeral 4 designates an instrument panel.

Figure 2:
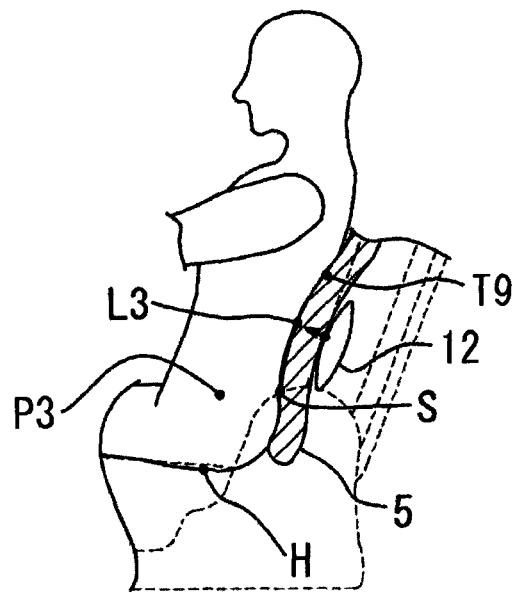
FIG. 2 is a schematic explanatory view illustrating an arranging position of an occupant's body-motion promoting means provided at the vehicle seat.
Figure 3:
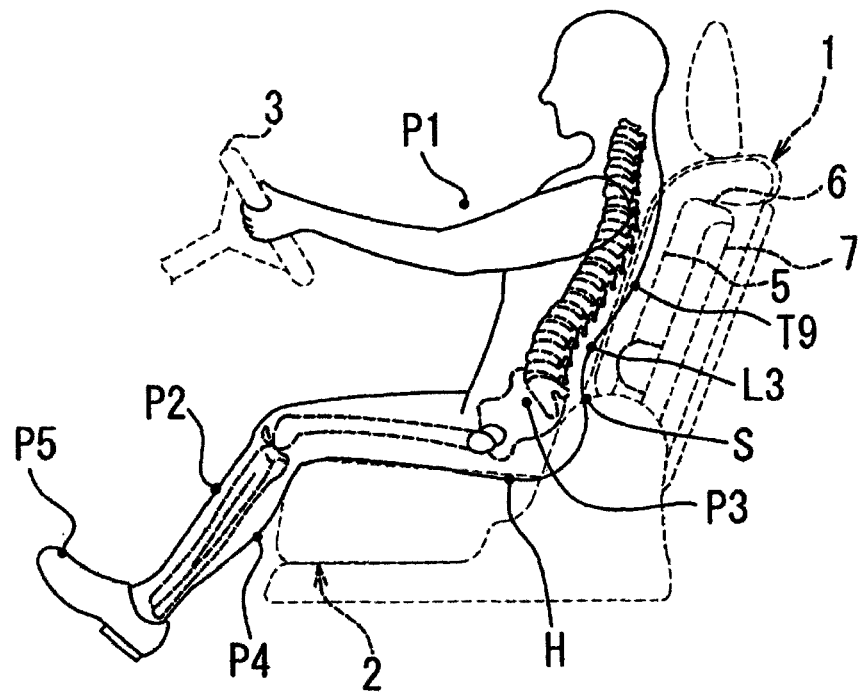
FIG. 3 is a schematic explanatory view illustrating a relative position between the skeleton of an occupant sitting on the vehicle seat and the occupant's body-motion promoting means.
Figure 4:
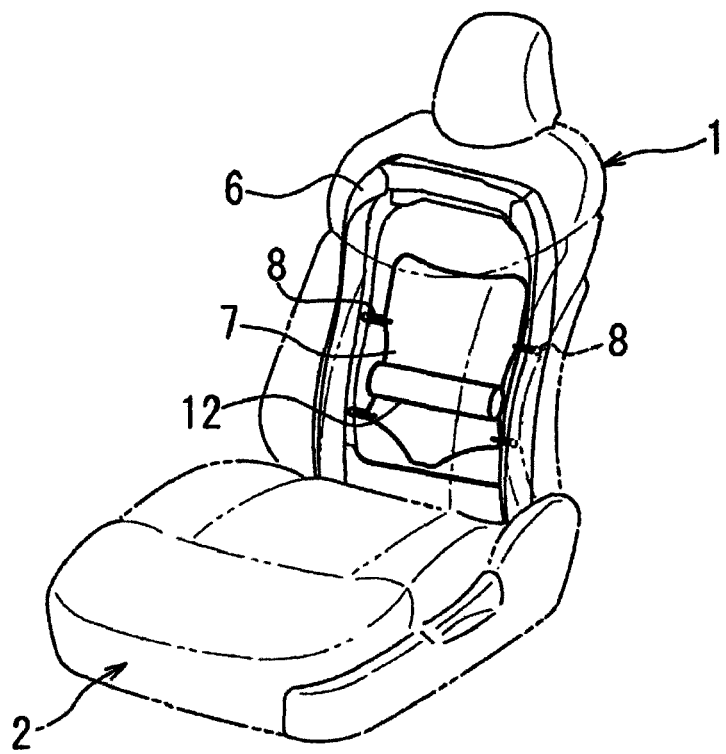
FIG. 4 is a schematic explanatory view illustrating a frame structure for a seat back of the vehicle seat, in which a fatigue relieving system is provided.

Referring to FIGS. 2 to 4, the seat back 1 of the driver's seat includes a foamed urethane pad 5 whose portion positionally corresponding to a resting surface of the seat back has a thickness of about 30-40 mm, a seat back frame 6, a resinous plate 7 arranged in the seat back frame 6, and wire springs 8 stretched between the seat back frame 6 and the resinous plate 7 for supporting the resinous plate 7. Moreover, the seat back 1 includes angle sensors or acceleration sensors 10a, 10b for detecting angles of the pelvis region and ninth thoracic vertebrae of the occupant on the vehicle seat in order to detect an amount of variation in the angle of the pelvis of the occupant on the seat during driving of the vehicle, and a means 11 provided behind the pad 5 for locally vibration-pressing and moving an occupant's body during driving of the vehicle thereby promoting blood circulation (hereinafter referred to as "occupant's body-motion promoting means").

The occupant's body-motion promoting means 11 includes an air bag 12 which is inflatable and deflatable by supplying air to the air bag 12 and sucking air from the air bag 12 and serves as a pressing section for vibration-pressing the third lumbar vertebrae of the occupant, and an operation section 13 for allowing air to be supplied to the air bag 12 and allowing air to be sucked from the air bag 12.

The air bag 12 is formed from an air tube having a length substantially equal to a width of the resinous plate 7, and provided in the seat back 1 so as to able to press the pad 5 from a rear side, by causing the air bag 12 to be fixed to the resinous plate 7 by means of clips (not shown).

In a deflated state, the air bag 12 exhibits a shape that allows the air bag 12 to be received by the resinous plate 7 and does not allow the air bag to press the occupant. On the other hand, in an inflated state, the air bag 12 exhibits a shape that allows the air bag 12 to cause the resting surface of the seat back to be operatively bulged through the pad 5, to thereby press the occupant. Incidentally, the air bag is usually maintained in the deflated state.

The air bag 12 is arranged at a position which corresponds to a region of the occupant's body which includes the third lumbar vertebrae of the occupant and a region close to the third lumbar vertebrae, and is provided so as to be able to press the third lumbar vertebrae in the inflated state of the air bag 12. More particularly, in the inflated state, the air bag is provided for pressing the third lumbar vertebrae only rather than pressing the thoracic vertebrae and the pelvis.

The reason for causing the air bag 12 to be arranged at the position corresponding to the region of the occupant's body which includes the third lumbar vertebrae and the region close to the third lumbar vertebrae is that, at the time of pressing the occupant's body by the air bag 12, an adverse effect on the posture of the occupant and a feeling of physical disorder can be suppressed and, in addition, increasing of an amount of the bloodstream in the lower limbs of the occupant can be promoted by such an arrangement of the air bag 12.

The reason that the increasing of the amount of the bloodstream by pressing the third lumbar vertebrae by the air bag 12 can be promoted is that the third lumbar vertebra is a region at which the trunk of the occupant is bent and easy to be deformed and the amount of the bloodstream is easily increased due to rhythmic contraction of the back muscle of the waist by bending of the trunk of the occupant, to thereby promote vein circulation due to a muscle pumping action and, when the occupant bends himself/herself backward to thereby take a deep breath, an amount of the vein circulation is increased by a breath pumping action.

The operation section 13 is electrically connected to the angle sensors or acceleration sensors 10a, 10b through an automatic control circuit so that it causes the air bag 12 to be automatically actuated when the sensors 10a, 10b detect that variation in the angle of the pelvis region of the occupant reaches a value equivalent to or more than a predetermined value.

The operation section 13 is configured to include a sequencer 14a for performing controls according to a predetermined order, a program circuit 14b for setting operation start of the air bag, etc., according to predetermined input data, an air compressor 14c for supplying air to the air bag and sucking air from the air bag, according to instructions from the program circuit 14b, and a solenoid valve 14d. In addition, there is provided a display 15 which is electrically connected to the sensors 10a, 10b and the operation section 13, and configured to input predetermined operation information to the program circuit 14b by touching operation on a screen of the display 15.

In the vehicle seat provided with the fatigue relieving system constructed as discussed above, the following process is performed prior to driving of the vehicle. The entire system is adapted to be commenced to be operated by turning on a power switch (not shown) which is provided at the steering wheel 3, the instrument panel 4 or other position near the occupant. First of all, positions of respective sections of the vehicle seat are adjusted so as to match a posture of the vehicle seat which allows the driver to sit on the vehicle seat. In this condition, the driver sits on the vehicle seat, turns the power switch on in order to cause the system to be operated, and then moves his/her upper body several times in order to simulate motion of his/her upper body which will be brought about due to fatigue of the driver during driving of the vehicle. By such simulation, an amount of variation in the angle of the pelvis of the driver is estimated by the sensors 10a, 10b. Information on a degree of the fatigue of the occupant which is obtained from the estimated amount of the variation in the angle of the pelvis of the driver is inputted to the display 15 and then inputted to the program circuit 14b from the display 15. Thus, control requirements for the entire system are set.

When the setting of the requirements is performed, the automatic control circuit is driven so as to calculate the amount of variation in the angle of the pelvis utilizing the program circuit 14b, whereby a simulation value is obtained.

In a condition where the foregoing process is completed, the driver commences driving the vehicle. When it is detected by the angle sensors or acceleration sensors 10a, 10b that an angle of the pelvis of the driver reaches the simulation value due to the motion of the driver's body which is brought about due to fatigue of the driver during driving for many hours, a detection value is obtained by the angle sensors or acceleration sensors 10a, 10b and instructions according to the detection value are inputted to the sequencer 14a. Then, the sequencer 14a causes the compressor 14c to be operated. By the operation of the compressor 14c, supplying of air to the air bag 12 and sucking of air from the air bag 12 are performed. The supplying and sucking of air are adapted to be controlled by the solenoid valve 14d.

The supplying and sucking of air are repeatedly performed to thereby inflate and deflate the air bag 12, whereby the third lumbar vertebrae of the driver is, repeatedly, pressed by the air bag 12 and released from the pressure by the air bag 12.

It has been proved by many tests conducted by the inventor that in the repeated-operation of the air bag 12, an amount of stroke that allows the air bag 12 to effectively press the third lumbar vertebrae of the occupant on the vehicle seat is preferably more than 10 mm. Here, "the amount of stroke" is defined as an amount of operative bulging of a surface of the seat back 1 contacting the occupant, which is brought about through the pad 5 by the inflation of the air bag 12. If the operative bulging amount is too small, the effect of positively promoting the blood circulation of the occupant can not obtained. It has been also proved by the tests that a load applied to the occupant by the inflation of the air bag 12 is preferably more than 75 N.

On the other hand, if the amount of the stroke is too large, an undesirable effect is exerted on the posture of the occupant of the seat and the system is easy to inevitably become large-sized in order to increase the amount of stroke. For this reason, in the system according to the present invention, preferably, the amount of stroke is set at a value equal to or less than 20 mm and the load applied to the occupant is set at 155 N or less.

Particularly, as seen from test-examples that will be discussed hereinafter, it is preferable that the amount of stroke is set in a range of 15 mm to 20 mm and the load is set in a range of 115 N to 155 N.

The speed of the repeated-operation of the air bag can be suitably controlled, for example, by adjusting the speed of supplying of air to the air bag and/or the speed of sucking of air from the air bag. Regarding time taken by the one cycle operation of the air bag, if a case where action of the air bag in which the amount of stroke reaches a predetermined amount from a condition where the amount of stroke is zero, and returned to zero is successively performed at a substantially constant speed is considered, the time may be set in a range of 10 seconds to 30 seconds. When the time is set within this range, a feeling of physical disorder is not given to the occupant.

In the embodiment according to the present invention, the repeated-operations are intermittently performed. More particularly, the repeated-operation is once performed several times and, after passage of a predetermined time, the repeated-operation is again performed several times. If the repeated-operation is successively performed for a long time, the effect of relieving the fatigue of the occupant on the seat may be reduced.

Regarding the repeated-operations which are required to be intermittently performed, the number of times the repeated-operation is successively performed at a time may be set in a range of three to seven times.

If the number of times is too small, it has been recognized that the blood circulation of the occupant on the seat is not promoted, and the effect of relieving the fatigue of the occupant on the seat is easy to be reduced. On the other hand, if the number of times is too large, the occupant on the vehicle seat tends to act so as to resist the operation, whereby myotony is provoked.

As seen from the test-examples discussed hereinafter, preferably, the number of times the repeated-operation is successively performed at a time is set in a range of three to five times and, further preferably, set to three times.

Moreover, the time interval between the repeated-operations intermittently performed may be set in a range of 5 minutes to 10 minutes.

If the time interval is too short, the occupant on the seat tends to act so as to resist the repeated-operations and, consequently, myotonia may be provoked. On the other hand, if the time interval is too long, the effect of promoting the blood circulation of the occupant on the seat can not be obtained and the effect of relieving the fatigue of the occupant on the seat is easy to be reduced.

As particularly seen from the test-examples discussed hereinafter, the time interval between the repeated-operations intermittently performed is preferably set to five minutes.

In the fatigue relieving system according to the embodiment of the present invention, the requirements which are set as discussed above are set so as to be combined with one another, whereby lumbago which the occupant on the seat has during the driving of the vehicle for many hours can be relieved and the blood circulation in the lower limbs of the occupant on the seat can be promoted, thus making it possible to relieve the fatigue of the occupant on the seat during driving of the vehicle.

Incidentally, when the predetermined operations are performed, it is estimated that the fatigue of the occupant on the seat is relieved. An electric circuit design for the system is configured such that, after it is estimated that the fatigue of the occupant on the seat is relieved, an indication showing stopping of the system is displayed on the screen of the display 15, the entire system is re-set, and the screen goes back to its initial display.

According to the vehicle seat provided with the fatigue relieving system configured as discussed above, the occupant's body-motion promoting means intermittently performs the repeated-operations of pressing the third lumbar vertebrae of the occupant on the seat and releasing of the third lumbar vertebrae from the pressure for the predetermined number of repetitions, at the predetermined stroke, at the predetermined load against the third lumbar vertebrae and, at the predetermined time interval, whereby the occupant's body is moved at a level such that the blood circulation of the occupant is promoted. Thus, it is possible to promote the blood circulation in the lower limbs of the occupant and facilitate relieving of the fatigue of the occupant. Particularly, the occupant is moved so as to be pressed at his/her third lumbar vertebrae by the inflation and deflation of the air bag, so that an adverse effect is not exerted on the posture of the occupant on the seat, a feeling of physical disorder is not given to the occupant on the seat, and the driving operation by the driver on the seat is not adversely affected.

In the embodiment according to the present invention, the amount of variation in the angle of the pelvis of the occupant on the seat is detected by the angle sensors or acceleration sensors 10*a*, 10*b* and the repeated-operations are then carried out, so that the fatigue of the occupant resulting from sitting on the seat for many hours is automatically estimated and the occupant's body is caused to be moved in order that the blood circulation of the occupant on the seat is promoted, thus making it possible to positively facilitate the relieving of the fatigue of the occupant on the seat.

While the case where the occupant's body-motion promoting means 11 which includes the air bag 12 and the operation section 13 has been discussed above, an occupant's body-motion promoting means which includes second air bags or air tubes for pressing regions other than the third lumbar vertebrae of the occupant on the seat in addition to the air bag 12 and the operation section 13 may be employed. In this case, the operation section 13 may be configured to be used for actuating the second air bags or air tubes as well as the air bag 12, or a special operation-section for the second air bags or air tubes may be employed in addition to the operation section 13.

While the air bag for pressing the third lumbar vertebrae of the occupant on the seat and releasing the lumbar vertebrae of the occupant on the seat from the pressure by the air bag is employed in the above-mentioned embodiment, for example, any suitable forward/rearward movable air-cylinder for pressing the third lumbar vertebrae of the occupant on the seat and releasing the lumbar vertebrae of the occupant on the seat from pressure by the air cylinder may be employed in lieu of the air bag. In this case, the same effect provided by the air bag can be obtained.

The test-examples will be discussed hereinafter.

Vehicle Seat

In the test-examples, a vehicle seat provided with a fatigue relieving system which includes a first forward/rearward movable air-cylinder for applying the repeated-operations to the third lumbar vertebrae L3 (FIG. 3) of an occupant on the vehicle seat, which is provided in lieu of the air bag 12 was employed. This fatigue relieving system further includes second vertically movable air-cylinders provided in regions of a pad of a seat cushion which correspond to the buttocks H (FIG. 3) of the occupant on the seat, a third forward/rearward movable air-cylinder provided in a region of a pad of a seat back which corresponds to the pelvis S (FIG. 3) of the occupant on the seat, and a fourth forward/rearward movable air-cylinder provided in a region of the pad of the seat back which corresponds to the thoracic vertebrae T9 (FIG. 3) of the occupant on the seat. These air-cylinders are adapted to carry out the repeated-operations. Incidentally, the vertically movable air-cylinders are adapted to be actuated independently from each other.

Test-Example 1

In a test-example 1, as shown in FIG. 3, angle detecting devices (not shown) were attached to the right arm P1 of the occupant on the seat, the right crus (leg) P2 of the occupant on the seat, and a region of the occupant which is close to the right pelvis P3 of the occupant on the seat. Moreover, the repeated-operations were performed by a stroke amount of 20 mm (load: 155 N) and variations in angles of the above regions of the occupant on the seat were detected by the angle detecting devices. Incidentally, variations of the angles of the buttocks of the occupant on the seat in a case Hs (FIG. 5) where the repeated-operations with respect to the buttocks were simultaneously performed, and variations of the angles of the buttocks of the occupant on the seat in a case Hr (FIG. 5) where the repeated-operations with respect to one of the buttocks and the repeated-operations with respect to the other of the buttocks were alternately performed (right buttock→left buttock→right buttock) were detected.

Figure 5:
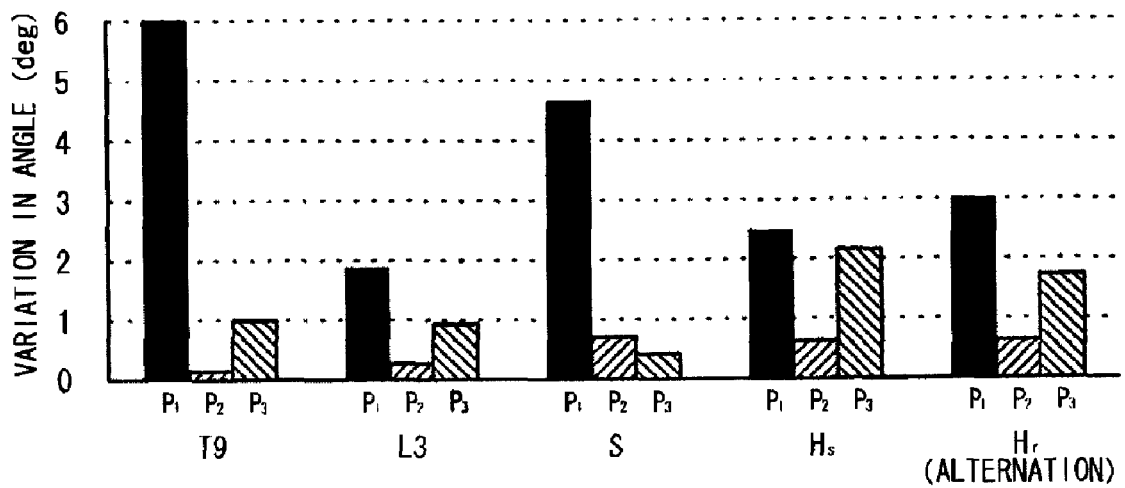
FIG. 5 is a graph illustrating the results obtained by a test-example 1.

The results that were obtained from the test-example 1 are shown in FIG. 5.

As seen from the results shown in FIG. 5, the variation in the angle of the third lumbar vertebrae L3 to which the repeated-operations are applied by the first cylinder is smallest. When the repeated-operations were applied to the thoracic vertebrae T9 of the occupant, the variation in the angle of the arm of the occupant became largest. Therefore, it can be seen from the test results that among feelings of physical disorder given to the occupant by applying of the repeated-operations to the third lumbar vertebrae, buttocks, pelvis, and thoracic vertebrae of the occupant, the feeling of physical disorder given to the occupant by applying the repeated-operations to the third lumbar vertebrae is most suppressed.

Test-Example 2

In a test-example 2, devices for detecting a bloodstream in the skin of the person were attached to the left leg P4 (FIG. 3) and the first toe P5 (FIG. 3) of the right foot of the occupant. After the person was left sitting on the seat for a predetermined time period, the repeated-operations were applied to each of the third lumbar vertebrae, buttocks, pelvis, and thoracic vertebrae of the occupant on the seat. Before and after the performing of the repeated-operations, variation in the bloodstream of the person on the seat was measured. The repeated-operations were performed three times by a stroke amount of 20 mm.

Figure 6:
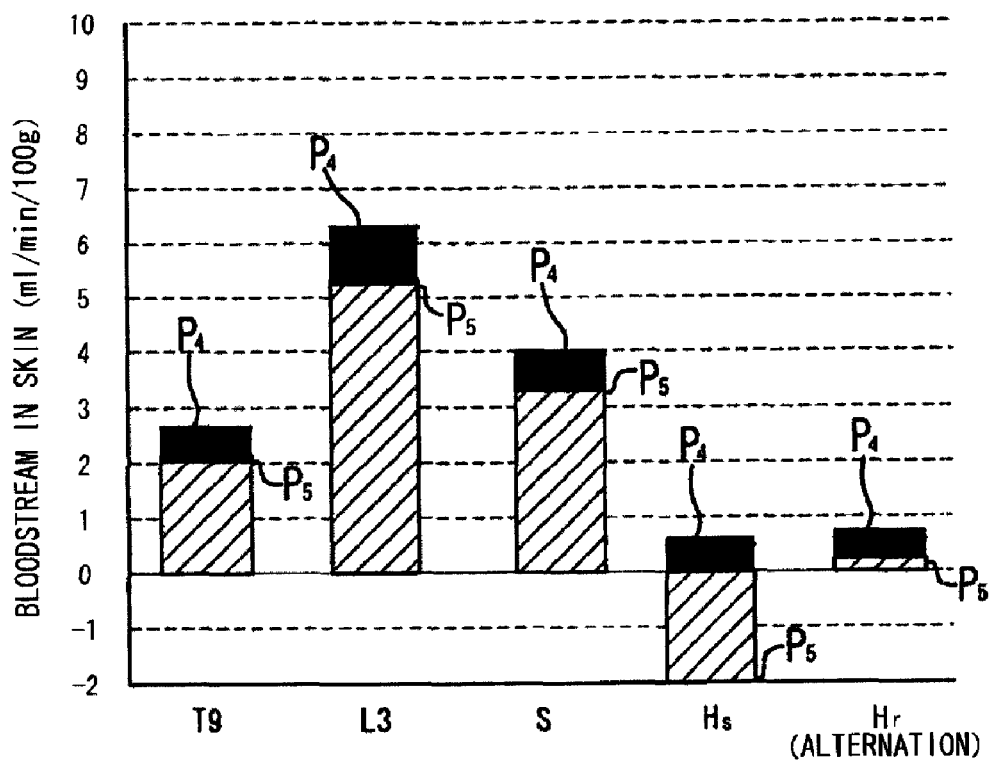
FIG. 6 is a graph illustrating the results obtained from a test-example 2.

The results obtained from the test-example 2 are shown in FIG. 6.

As seen from the results shown in FIG. 6, the variation in the bloodstream in the skin of the occupant is largest when the repeated-operations are applied to the third lumbar vertebrae of the occupant, and the variation in the bloodstream in the skin of the occupant is smallest when the repeated-operations are applied to the buttocks in such a manner that the repeated-operations are simultaneously applied to the buttocks of the occupant. Therefore, it can be seen from the results of the test-example 2 that the effect of promoting the blood circulation in the lower limbs of the occupant and facilitating the relieving of fatigue of the occupant is most enhanced by applying the repeated-operations to the third lumbar vertebrae of the occupant.

Therefore, it is confirmed from the results of the test-examples 1 and 2 that if the repeated-operations are applied to the third lumbar vertebrae L3 of the occupant to thereby cause the occupant's body to be moved, the adverse effect to be exerted on the posture of the occupant on the seat and the feeling of physical disorder to be given to the person on the seat are reduced and the blood circulation in the lower limbs of the occupant is promoted, thus making it possible to facilitate the relieving of fatigue of the occupant.

Test-Example 3

In a test-example 3, the amounts of stroke were changed, the repeated-operations were applied to only the third lumbar vertebrae L3 of the person on the seat, and variations in the bloodstream of the occupant before and after the applying of the repeated-operation to the third lumbar vertebrae were measured. The repeated-operations were performed three times.

Figure 7:
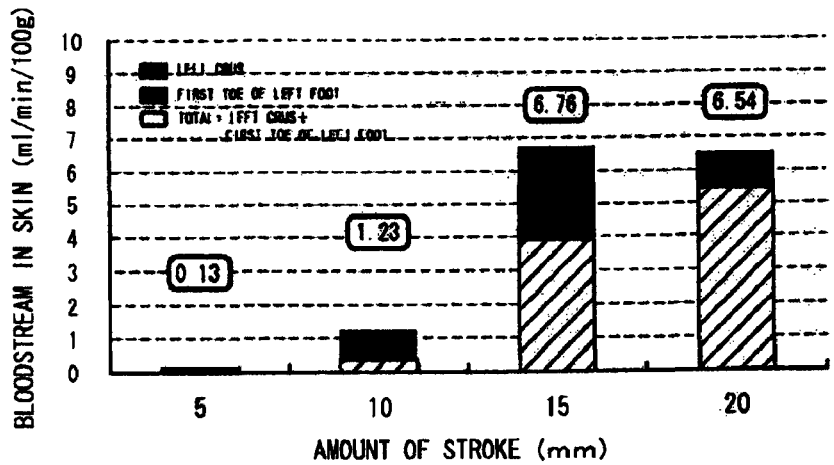
FIG. 7 is a graph illustrating the results obtained from a test-example 3.

The results obtained from the test-example 3 are shown in FIG. 7.

As seen from FIG. 7, the variation in the bloodstream of the occupant is small when the amount of stroke is equal to or less than 10 mm (load is equal to or less than 75 N). Therefore, in this case, it is seen that the effect of sufficiently relieving fatigue of the occupant cannot be obtained. FIG. 7 shows that when the amount of stroke is set in a range of 15 mm to 20 mm (load is set in a range of 115 N to 155 N), good results can be obtained.

Figure 8:
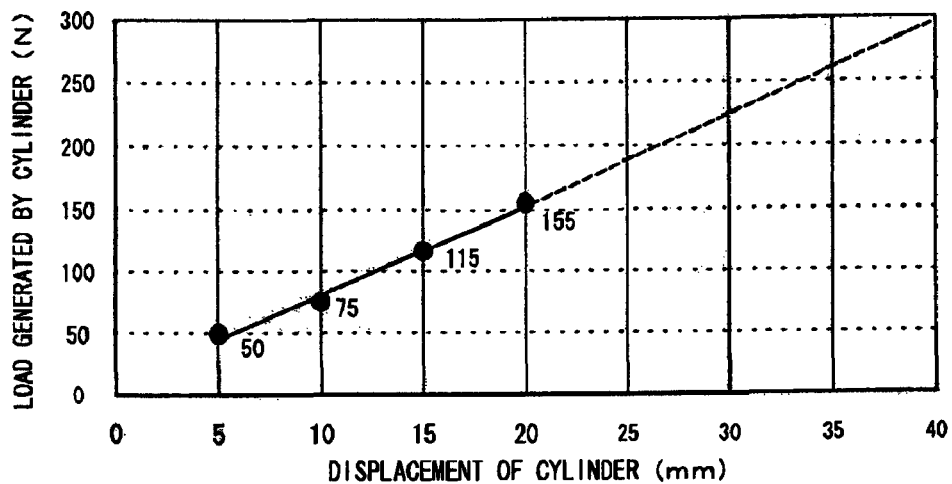
FIG. 8 is a graph illustrating correlation between variation in an amount (mm) of displacement of a cylinder and a load generated by the cylinder.

Incidentally, correlation between a variation in an amount (mm) of displacement of the first cylinder and a load N produced by the first cylinder was estimated and is shown in FIG. 8.

Reference Test-Example

A comparison between variations in the bloodstream due to the person's body-motion which is brought about by various operations during actual driving of the vehicle, and variations in the bloodstream due to the person's body-motion which is brought about by applying the repeated-operations to the third lumbar vertebrae was made.

Devices for detecting a bloodstream in the skin of the occupant were attached to the left crus P4 and the first toe P5 of the left foot of the occupant. After the person was left sitting on the seat for a predetermined time period, he/she performed various operations and variations in the bloodstream in the skin before and after the performing of the various operations were measured.

The various operations include four operations, namely, an operation (RR) in which the person causes the steering wheel to make one turn in a right direction, an operation (LR) in which the person causes the steering wheel to make one turn in a left direction, a negative operation (PN) in which, with very little muscular power, the person depresses an accelerator pedal of the vehicle, which is situated at an angle of 60 degrees relative to a vehicle floor, so as move the pedal to a position at an angle of 30 degrees relative to the vehicle floor, and then allows the pedal to be returned to an original position, and a positive operation (PP) in which, the person strongly depresses the accelerator pedal with an enough muscular power to thereby cause the pedal to be moved to the position at the angle of 30 degrees relative to the vehicle floor, and then allows the pedal to be returned to the original position. Incidentally, the variation in the bloodstream in the case where the stroke amount of 20 mm was set for applying of the repeated-operations to the third lumbar vertebrae in the test-example 3 was employed.

Figure 9:
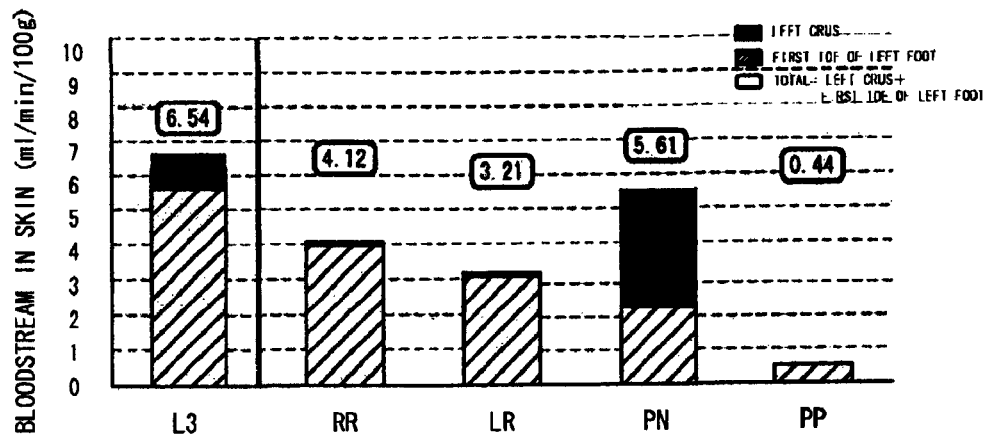
FIG. 9 is a graph illustrating the results obtained from a reference test-example.

The results obtained from the reference test-example are shown in FIG. 9.

As seen from FIG. 9, it is confirmed that variation in the bloodstream due to the application of the repeated-operations to the third lumbar vertebrae is slightly increased as compared with variation in the bloodstream due to the performing of the negative operation (PN), and the occupant's motion promoting effect can be promoted by the application of the repeated-operations to the third lumbar vertebrae.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

What is claimed is:

1. A vehicle seat provided with a system for facilitating relieving of fatigue of a driver on said seat driving a vehicle, said vehicle seat comprising a seat back having a pad;
   said system comprising:
   sensors provided in said seat back;
   said sensors being adapted to detect an amount of variation in an angle of the pelvis of the driver when the driver moves his/her body due to the fatigue of the driver during the driving of the vehicle for many hours;
   an occupant's body-motion promoting means provided in said seat back so as to be arranged behind said pad for pressing the third lumbar vertebrae of the driver and releasing the driver's body from pressure, during the driving of the vehicle, thereby moving the driver's body and promoting blood circulation of the driver; and
   an operation means having a section electrically connected to said sensors and a section connected to said occupant's body-motion promoting means, said operation means being configured to actuate said occupant's body-motion promoting means according to instructions from said sensors when said sensors detect said amount of variation in the angle of the pelvis of the driver during the driving of the vehicle, in such a manner that said occupant's body-motion promoting means intermittently performs repeated pressing/releasing operations with respect to the third lumbar vertebrae of the driver in a range of three to seven times, at a stroke amount in a range of 10 mm to 20 mm, and at a time interval of 5 minutes to 10 minutes, whereby the driver's body is moved and the blood circulation of the driver is promoted.

2. A vehicle seat according to claim 1, wherein said operation means is configured to actuate said occupant's body-motion promoting means in such a manner that said occupant's body-motion promoting means intermittently performs the repeated pressing/releasing operations at the stroke amount in a range of 15 mm to 20 mm.

3. A vehicle seat according to claim 2, wherein said operation means is configured to actuate said occupant's body-motion promoting means in such a manner that said occupant's body-motion promoting means intermittently performs the repeated pressing/releasing operations for 5 minutes.

4. A vehicle seat according to claim 3, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

5. A vehicle seat according to claim 2, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

6. A vehicle seat according to claim 1 or 2, wherein said operation means is configured to actuate said occupant's body-motion promoting means in such a manner that said occupant's body-motion promoting means intermittently performs the repeated pressing/releasing operations in a range of three to five times.

7. A vehicle seat according to claim 6, wherein said operation means is configured to actuate said occupant's body-motion promoting means in such a manner that said occupant's body-motion promoting means intermittently performs the repeated pressing/releasing operations for 5 minutes.

8. A vehicle seat according to claim 7, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

9. A vehicle seat according to claim 6, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

10. A vehicle seat according to claim 1, wherein said operation means is configured to actuate said occupant's body-motion promoting means in such a manner that said occupant's body-motion promoting means intermittently performs the repeated pressing/releasing operations for 5 minutes.

11. A vehicle seat according to claim 10, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

12. A vehicle seat according to claim 1, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

13. A vehicle seat provided with a system for facilitating relieving of fatigue of a driver on said seat driving a vehicle, said vehicle seat comprising a seat back having a pad;
said system comprising:
sensors provided in said seat back;
said sensors being adapted to detect an amount of variation in the angle of the pelvis of the driver when the driver moves his/her body due to the fatigue of the driver during the driving of the vehicle for many hours;
an occupant's body-motion promoting means provided in said seat back so as to be arranged behind said pad for pressing the third lumbar vertebrae of the driver and releasing the driver's body from pressure, during the driving of the vehicle, thereby moving the driver's body and promoting blood circulation of the driver; and
an operation means having a section electrically connected to said sensors and a section connected to said occupant's body-motion promoting means, said operation means being configured to actuate said occupant's body-motion promoting means according to instructions from said sensors when said sensors detect said amount of variation in the angle of the pelvis of the driver during the driving of the vehicle, in such a manner that said occupant's body-motion promoting means intermittently performs repeated pressing/releasing operations with respect to the third lumbar vertebrae of the driver in a range of three to seven times, at a load in a range of 75 N to 155 N, and at a time interval of 5 minutes to 10 minutes, whereby the driver's body is moved and the blood circulation of the driver is promoted.

14. A vehicle seat according to claim 13, wherein said operation means is configured to actuate said occupant's body-motion promoting means in such a manner that said occupant's body-motion promoting means intermittently performs the repeated pressing/releasing operations at a load in a range of 115 N to 155 N.

15. A vehicle seat according to claim 14, wherein said operation means is configured to actuate said occupant's body-motion promoting means in such a manner that said occupant's body-motion promoting means intermittently performs the repeated pressing/releasing operations for five minutes.

16. A vehicle seat according to claim 15, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

17. A vehicle seat according to claim 14, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

18. A vehicle seat according to claim 13 or 14, wherein said operation means is configured to actuate said occupant's body-motion promoting means in such a manner that said occupant's body-motion promoting means intermittently performs the repeated pressing/releasing operations times in a range of three to five times.

19. A vehicle seat according to claim 18, wherein said operation means is configured to actuate said occupant's body-motion promoting means in such a manner that said occupant's body-motion promoting means intermittently performs the repeated pressing/releasing operations for five minutes.

20. A vehicle seat according to claim 19, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

21. A vehicle seat according to claim 18, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

22. A vehicle seat according to claim 13, wherein said operation means is configured to actuate said occupant's body-motion promoting means in such a manner that said occupant's body-motion promoting means intermittently performs the repeated pressing/releasing operations for five minutes.

23. A vehicle seat according to claim 22, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

24. A vehicle seat according to claim 13, wherein said sensors are further adapted to detect a second amount of variation in the angle of the pelvis of the driver when, prior to the driving of the vehicle, the driver on said seat moves his/her upper body several times in order to simulate motion of his/her upper body which will be brought about due to the fatigue of the driver during the driving of the vehicle, and said operating means is adapted to actuate said occupant's body-motion promoting means according to instructions from said sensors when said amount of variation in the angle of the pelvis of the driver during the driving of the vehicle reaches said second amount of variation in the angle of the pelvis of the driver.

* * * * *